(12) United States Patent
Zens

(10) Patent No.: US 6,469,883 B1
(45) Date of Patent: Oct. 22, 2002

(54) METHOD AND APPARATUS FOR EARLY AC POWER FAILURE DETECTION

(75) Inventor: Christoph Zens, Marin, CA (US)

(73) Assignee: Coactive Networks, Inc., Sausalito, CA (US)

( * ) Notice: Subject to any disclaimer, the term of this patent is extended or adjusted under 35 U.S.C. 154(b) by 0 days.

(21) Appl. No.: 09/523,848

(22) Filed: Mar. 13, 2000

(51) Int. Cl.⁷ .................................................. H02H 3/00
(52) U.S. Cl. ...................................... 361/93.2; 307/129
(58) Field of Search ............................. 361/93.1, 93.2, 361/92; 307/23, 39, 48, 64, 126, 129; 327/198, 143; 324/771, 76.39; 340/657, 660, 663, 693.1

(56) References Cited

U.S. PATENT DOCUMENTS

| | | | |
|---|---|---|---|
| 3,937,937 A | 2/1976 | McVey | 235/153 R |
| 3,955,102 A | 5/1976 | Chi | 307/235 E |
| 4,065,676 A | 12/1977 | Elias | 307/66 |
| 4,229,699 A | 10/1980 | Smith | 307/354 |
| 4,245,150 A | 1/1981 | Driscoll et al. | 235/92 FP |
| 4,342,922 A | 8/1982 | DiMassimo et al. | 307/66 |
| 4,480,200 A | 10/1984 | Tan | 307/354 |
| 4,642,616 A | 2/1987 | Goodwin | 340/663 |
| 4,855,722 A | 8/1989 | Mostyn et al. | 340/660 |
| 5,285,452 A | 2/1994 | Wee et al. | 371/12 |
| 5,568,398 A | 10/1996 | Trainor | 364/492 |

Primary Examiner—Ronald W. Leja
(74) Attorney, Agent, or Firm—Sawyer Law Group LLP

(57) ABSTRACT

The present invention provides a method and apparatus for alternating current (AC) power failure detection. The method includes amplifying an AC power waveform, where the amplified waveform is asserted when the AC power waveform is in a vicinity of a zerocrossing and negated at all other times; initiating a counter when the amplified waveform is asserted; and determining if the counter equals or exceeds a reference number, where the counter being equal or exceeding the reference number indicates an AC power failure. The present invention converts an AC power signal to a near digital signal, where the near digital signal is asserted when the AC power signal is in the vicinity of a zero-crossing and negated at all other times. When the near digital signal is asserted, a counter in a controller begins counting, and ends the counting when the near digital signal is negated. If the counter equals or exceeds a reference number before the near digital signal is negated, then a failure of the AC power signal is detected. A signal indicating the AC power failure is then output by the controller to initiate power down operations. By measuring the length of time the AC power signal remains in the vicinity of a zero-crossing, a failure of the AC power can be detected earlier than with conventional methods. This allows more time to perform power down operations.

22 Claims, 4 Drawing Sheets

METHOD AND APPARATUS FOR EARLY AC POWER FAILURE DETECTION

FIELD OF THE INVENTION

The present invention relates to power failure detection, and more particularly to early AC power detection.

BACKGROUND OF THE INVENTION

The use of alternating current (AC) to power electronic devices is very well known in the art. When AC power fails, the voltage drops to zero volts within a few milliseconds. The devices may use the time between the detection of the AC power failure and the drop to zero volts to perform power down operations, such as saving important system information.

FIG. 1 illustrates a conventional method of detecting an AC power failure. FIG. 1 illustrates a sample AC power waveform 102 with a periodicity of $t_2$. Within one period, the waveform 102 has two zero-crossings, at $t_1$, and $t_2$. Knowing the periodicity of the waveform 102, its zero-crossings may be anticipated. Thus, at times $t_1$, $t_2$ and $t_4$, the waveform 102 will cross zero volts if the AC power has not failed. The conventional method thus uses a zero-crossing detection circuit to detect whether or not the waveform 102 crosses zero at the anticipated times, $t_1$, $t_2$, and $t_4$.

For example, assume that the AC power waveform 102 fails at $t_3$. At $t_4$, the zero-crossing detection circuit detects if the waveform 102 crosses zero volts. Since the AC power waveform 102 has failed, it does not. Thus, the AC power failure is detected at $t_4$. A signal indicating the failure may then be sent to initiate the power down operations for the device.

However, under the conventional method, the AC power failure is not detected until time $t_4$, although the AC power failed at the earlier time, $t_3$. Thus, there is a lag time between the actual AC power failure and its detection. The device is thus not able to use this time period to perform more extensive power down operations.

Accordingly, there exists a need for an improved method and apparatus for AC power failure detection. The method and apparatus should be easy to implement and able to detect an AC power failure earlier than conventional methods. The present invention addresses such a need.

SUMMARY OF THE INVENTION

The present invention provides a method and apparatus for alternating current (AC) power failure detection. The method includes amplifying an AC power waveform, where the amplified waveform is asserted when the AC power waveform is in a vicinity of a zerocrossing and negated at all other times; initiating a counter when the amplified waveform is asserted; and determining if the counter equals or exceeds a reference number, where the counter being equal or exceeding the reference number indicates an AC power failure. The present invention converts an AC power signal to a near digital signal, where the near digital signal is asserted when the AC power signal is in the vicinity of a zero-crossing and negated at all other times. When the near digital signal is asserted, a counter in a controller begins counting, and ends the counting when the near digital signal is negated. If the counter equals or exceeds a reference number before the near digital signal is negated, then a failure of the AC power signal is detected. A signal indicating the AC power failure is then output by the controller to initiate power down operations. By measuring the length of time the AC power signal remains in the vicinity of a zero-crossing, a failure of the AC power can be detected earlier than with conventional methods. This allows more time to perform power down operations.

DETAILED DESCRIPTION

The present invention provides an improved method and apparatus for AC power failure detection. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
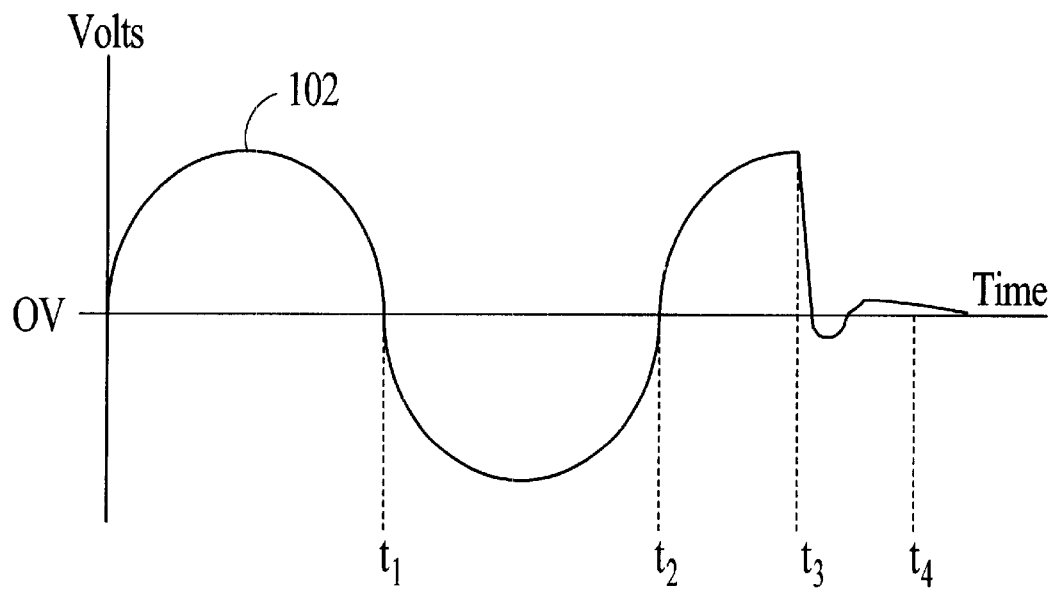
FIG. 1 illustrates a conventional method of detecting an AC power failure.
Figure 2:
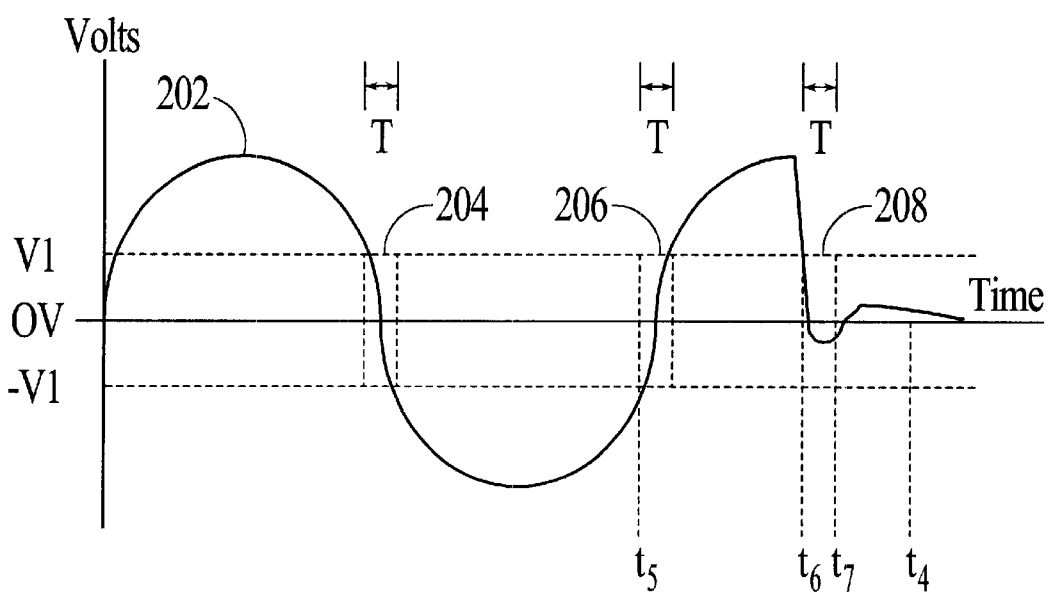
FIG. 2 illustrates a preferred embodiment of a method for early AC power failure detection in accordance with the present invention.

FIG. 2 illustrates a preferred embodiment of a method for early AC power failure detection in accordance with the present invention. FIG. 2 illustrates a sample AC power waveform 202. The method in accordance with the present invention measures the length of time the waveform 202 stays in the vicinity of zero volts, i.e., stays around the zerocrossings. When the AC power has not failed, the waveform 202 will travel from a positive or negative voltage, through zero volts but will not stay in its vicinity. When the waveform 202 reaches a threshold voltage, $\pm V1$, a window 204 of predetermined length, T, is opened. The length of time the waveform 202 remains in the vicinity of its zero-crossing within this window 204 is measured. The method of measurement is described more fully later in this specification. If the AC power has not failed, then the waveform 202 will leave the vicinity of the zero-crossing by the end of the window 204. If the AC power has failed, then the waveform 202 will remain in the vicinity of the zero-crossing. For example, when the waveform 202 reaches $-V1$ volts at $t_5$, the window 206 is opened. Since the AC power has not failed at this point, the waveform 202 leaves the vicinity of the zero-crossing by the end of the window 206. When the waveform 202 reaches V1 volts at time $t_6$, the window 208 is opened. Since the AC power has failed, the waveform 202 remains in the vicinity of the zero-crossing even at $t_7$, the end of the window 208. The AC power failure is thus detected at $t_7$. Instead of detecting the power failure at the next anticipated zero-crossing, $t_4$, the method in accordance with the present invention detects the AC power failure at the earlier time, $t_7$. This provides additional time to perform power down operations.

To more particularly describe the features of the present invention, please refer to FIGS. 3 through 5 in conjunction with the discussion below.

Figure 3:
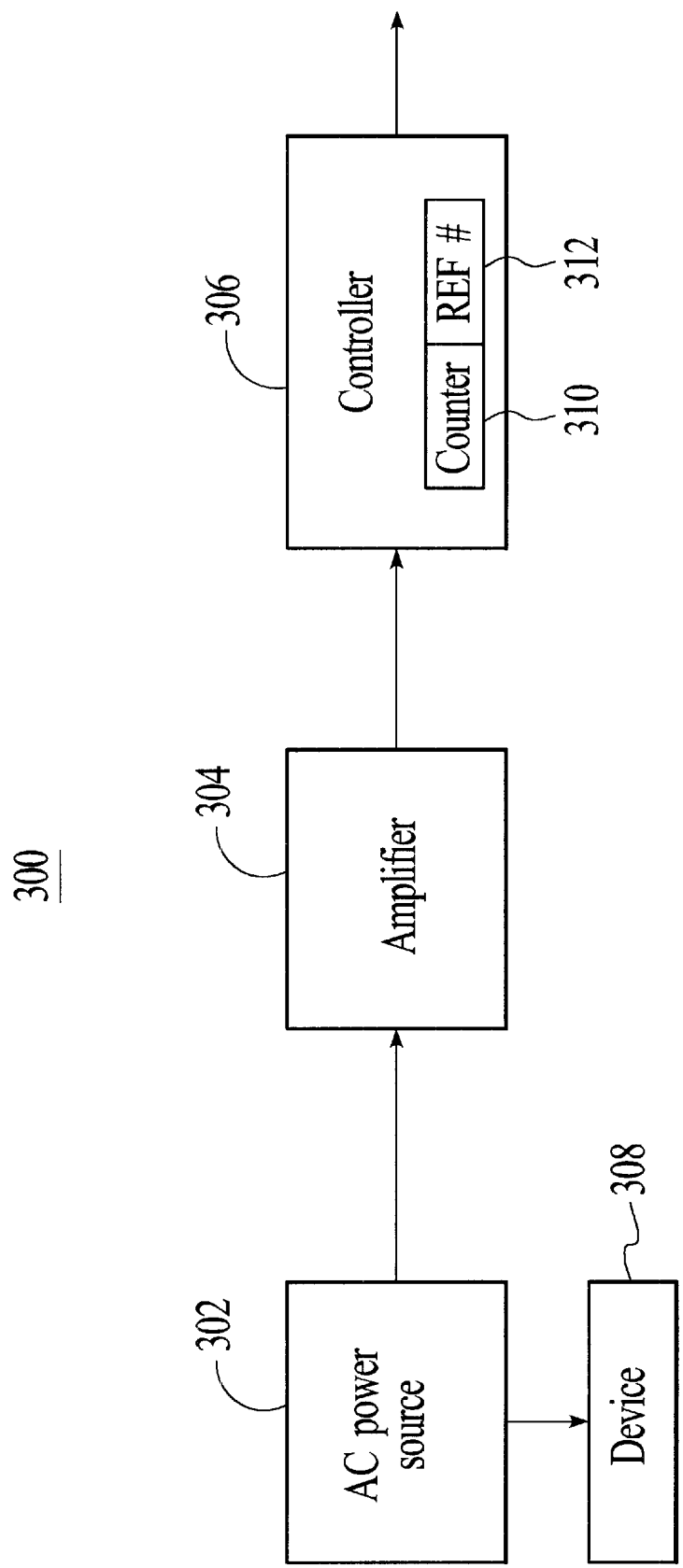
FIG. 3 illustrates a preferred embodiment of an early AC power failure detection apparatus in accordance with the present invention.

FIG. 3 illustrates a preferred embodiment of an early AC power failure detection apparatus in accordance with the present invention. The apparatus 300 comprises an AC power source 302 which powers a device 308. The AC power waveform 202 from the power source 302 is amplified by an amplifier 304. The amplifier 304 amplifies the waveform 202 such that a near digital signal is provided to the controller 306. The near digital signal will be low during the time periods that the waveform 202 remains in the vicinity of its zero-crossings and high during all other times. The controller 306 then analyzes the near digital signal. The controller 306 comprises a counter 310 and a reference number 312. Whenever the near digital signal is low, the counter 310 counts the length of time the near digital signal is low. If the count remains less than the reference number 312 when the near digital signal goes high, then the AC power waveform 202 did not remain around the zero-crossing and the AC power has not failed. If the count equals or exceeds the reference number 312 before the near digital signal goes high, then the AC power waveform 202 has remained in the vicinity of its zero-crossing, indicating that the AC power has failed.

Figure 4:
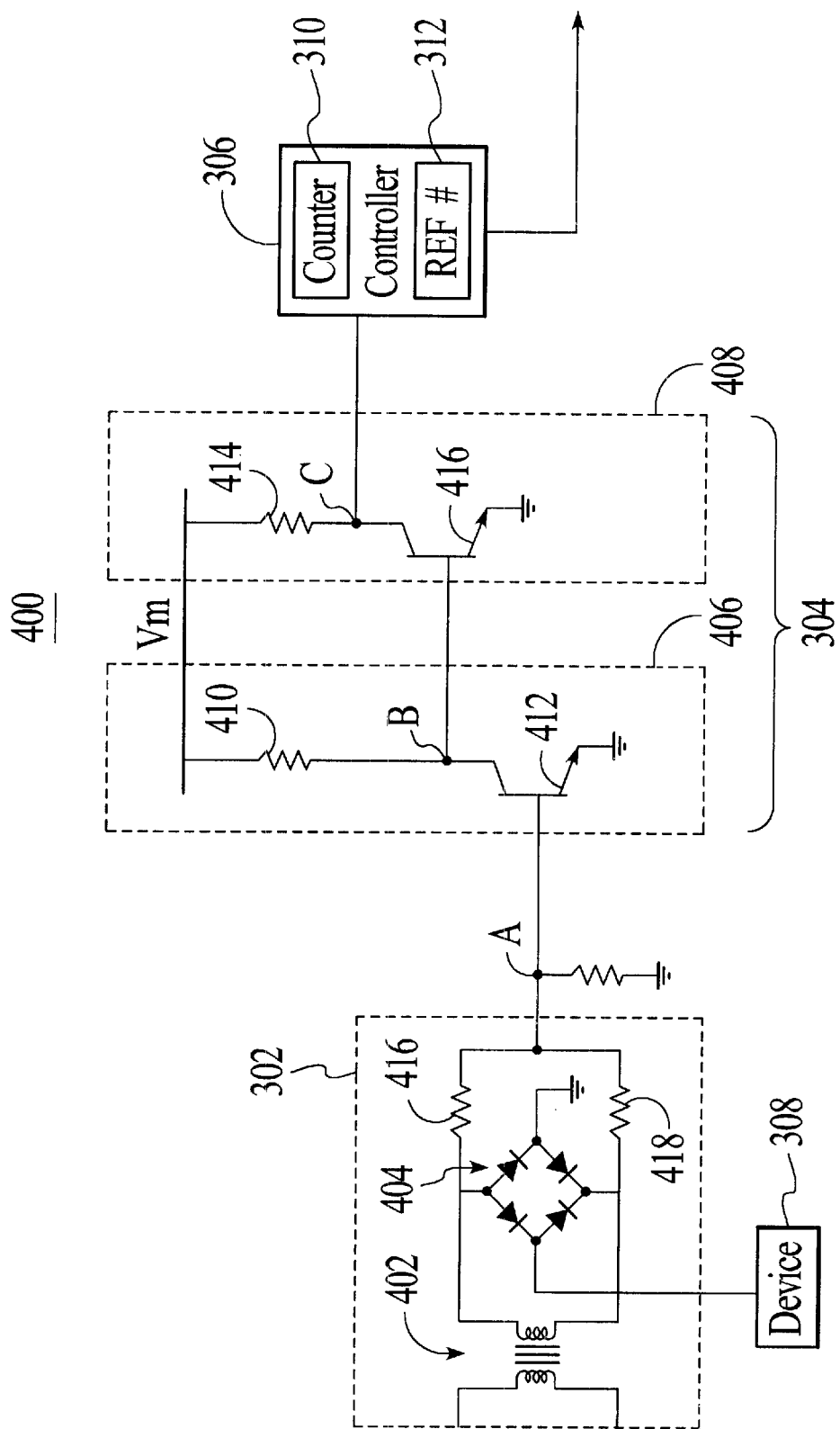
FIG. 4 is a circuit diagram illustrating in more detail the preferred embodiment of the apparatus for early AC power failure detection in accordance with the present invention.

FIG. 4 is a circuit diagram illustrating in more detail the preferred embodiment of the apparatus for early AC power failure detection in accordance with the present invention. The AC power source 302 of the apparatus 400 can be any type of AC power source. In the preferred embodiment, the power source comprises a transformer 402 and a bridge rectifier circuit 404 coupled to two resistors 416 and 418, as shown. The resistors 416, 418 sum the two half-wave rectified signals from the AC terminals of the bridge rectifier 404 to provide a fully rectified AC power waveform. The amplifier 304 comprises a first amplifier 406 and a second amplifier 408 in series. In the preferred embodiment, the amplifiers 406 and 408 truncate the input waveform at a maximum voltage, $V_M$.

Figure 5A:
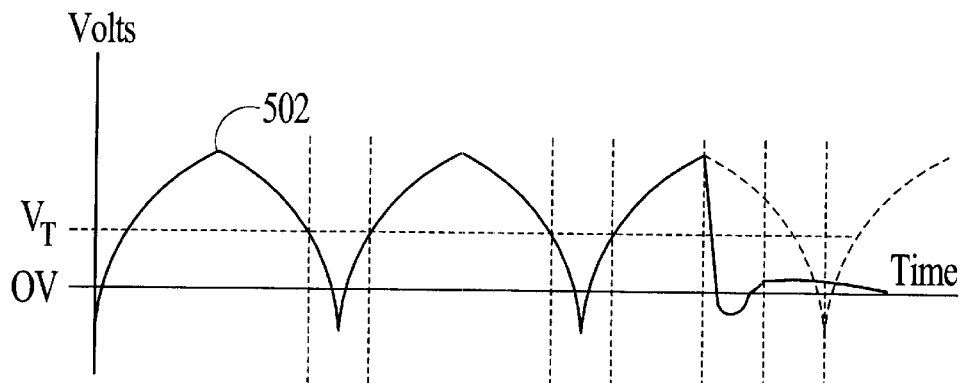
FIGS. 5A–5C illustrate the signals at different nodes of the circuit 500 in accordance with the present invention.
Figure 5B:
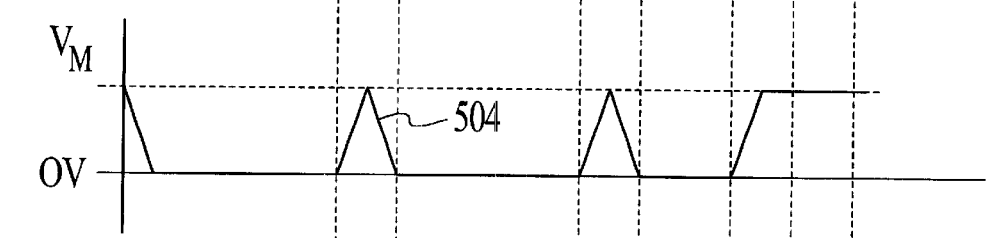
Figure 5C:
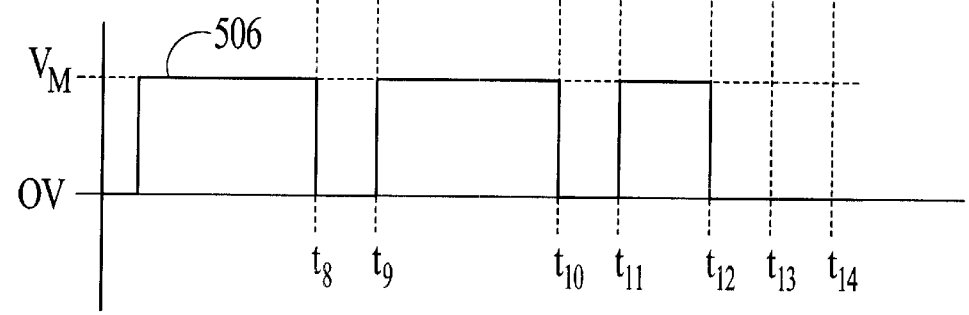

FIGS. 5A–5C illustrate the signals at different nodes of the circuit 400 in accordance with the present invention. FIG. 5A illustrates the fully rectified AC power waveform 502 provided by the power source 302 at node A. An AC power waveform of the type illustrated in FIG. 5A is well known in the art. This waveform 502 is then inputted into the first amplifier 406. For illustrative purposes, assume that $V_M$ is +3V, and that transistors 412 and 416 of the first and second amplifiers 406 and 408, respectively, have a threshold voltage, $V_T$, of approximately 0.5V. The first amplifier 406 amplifies and inverts the waveform 502. The amount of amplification depends upon the ratio of the value of resistor 410 and the input inductance of the transistor 412. The amplified waveform is truncated at $V_M$=3V and inverted, resulting in the waveform 504 illustrated in FIG. 5B. This waveform 504 is inputted to the second amplifier 408, which further amplifies the waveform 504, based upon the ratio of the value of resistor 414 and the input inductance of transistor 416. The amplified waveform is again truncated at 3V and inverted, resulting in the waveform 506 illustrated in FIG. 5C. The waveform 502 is thus amplified such that the waveform 506 at node C is a near digital signal. The waveform 506 is asserted during the time periods the waveform 502 is at or below about $V_T$=0.5V and negated at all other times.

Although the present invention is shown with two amplifiers, one of ordinary skill in the art will understand that any number of amplifiers may be used without departing from the spirit and scope of the present invention.

Although the near digital signal 506 in accordance with the present invention is shown low when asserted and high when negated, one of ordinary skill in the art will understand that the polarity of the near digital signal 506 may be reversed without departing from the spirit and scope of the present invention. The near digital signal may be either an active high signal or an active low signal, depending on whether the amplifier 304 is an inverting or a non-inverting amplifier.

The waveform 506 is input into the controller 306. Whenever the waveform 506 is asserted, the counter 310 of the controller 306 begins to count. The counter ends the count when the waveform 506 is negated again. The reference number 312 has been set to reflect the number of counts within which the waveform 506 should be negated if the AC power has not failed. In the preferred embodiment, the counting is implemented using a clock signal. The frequency of the clock and the reference number are programmable. Thus, the counter 310 begins to count at $t_8$ when the waveform 506 is asserted. When the waveform 506 is negated at $t_9$, the count remains less than the reference number 312. The AC power is thus still present. The counter 310 may then be reset. The counter 310 again begins to count at $t_{10}$ when the waveform 506 is asserted. When the waveform 506 is negated at $t_{11}$, the count remains less than the reference number 312. The AC power is thus still present, and the counter 310 may be reset. At $t_{12}$, the waveform 506 is asserted again, and the counter 310 begins to count. Because the AC power as failed, the waveform 506 remains asserted, and the counter 310 continues to count. At approximately $t_{13}$, the counter 310 equals or exceeds the reference number 312. A signal indicating an AC power failure is then outputted by the controller 306 to initiate power down operations. In the preferred embodiment, the signal is an interrupt request to a processor core, which will notify a program that a power down sequence should be initiated. The AC power failure is thus detected prior to the next expected zero-crossing, $t_{14}$, of the AC power waveform 502.

An improved method and apparatus for early AC power failure detection has been disclosed. The present invention converts an AC power signal to a near digital signal, where the near digital signal is asserted when the AC power signal is in the vicinity of a zero crossing and negated at all other times. When the near digital signal is asserted, a counter in a controller begins counting and ends the counting when the near digital signal is negated. If the counter equals or exceeds a reference number before the near digital signal is negated, then a failure of the AC power signal is detected. A signal indicating the AC power failure is then output by the controller to initiate power down operations. By measuring the length of time the AC power signal remains in the vicinity of a zero-crossing, a failure of the AC power can be detected earlier than with conventional methods. This allows more time to perform power down operations.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for alternating current (AC) power failure detection, comprising the steps of:
   (a) amplifying an AC power waveform, wherein the amplified waveform is asserted when the AC power waveform is in a vicinity of a zero-crossing and negated at all other times;

(b) initiating a counter when the amplified waveform is asserted; and (c) determining if the counter equals or exceeds a reference number, wherein the counter being equal or exceeding the reference number indicates an AC power failure, wherein a value of the reference number is programmable.

2. The method of claim 1, wherein the vicinity of the zero-crossing is a time period when the AC power waveform is below a threshold voltage.

3. The method of claim 1, wherein the amplifying step (a) comprises:

(a1) amplifying the AC power waveform with a first amplifier to obtain an intermediate waveformn, wherein the intermediate waveform is truncated at a maximum voltage and is inverted; and (a2) amplifying the intermediate waveform with a second amplifier to obtain the amplified waveform, wherein the amplified waveform is truncated at the maximum voltage and is inverted, wherein the amplified waveform is asserted when the AC power waveform is in the vicinity of the zero-crossing and negated at all other times.

4. The method of claim 1, wherein the determining step (c) comprises:

(c1) terminating the counter when the amplified waveform is negated; and (c2) determining if the counter equals or exceeds the reference number before the amplified waveform is negated, wherein the counter being equal or exceeding the reference number indicates the AC power failure.

5. The method of claim 1, further comprising:

(d) outputting a signal to initiate power down operations, if the counter equals or exceeds the reference number.

6. The method of claim 5, further comprising:

(e) resetting the counter if the counter does not equal or exceed the reference number.

7. An apparatus for detecting an AC power failure, comprising:

an AC power source for providing an AC power waveform;

an amplifier coupled to the AC power source, wherein the amplifier amplifies the AC power waveform, wherein the amplified waveform is asserted when the AC power waveform is in a vicinity of a zero-crossing and negated at all other times; and a controller coupled to the amplifier, the controller further comprising:

a counter, wherein the counter begins counting when the amplified waveform is asserted, wherein if the counter equals or exceeds a reference number, then an AC power failure is detected, wherein a value of the reference number is programmable.

8. The apparatus of claim 7, wherein the amplifier comprises:

a voltage source for providing a maximum voltage;

a first amplifier, comprising:

a first resistor coupled to the voltage source, and a first transistor comprising a first collector, a first base, and a first emitter, wherein the first base is coupled to the AC power source, the first collector is coupled to the first resistor, and the first emitter is coupled to ground; and a second amplifier, comprising:

a second resistor coupled to the voltage source, and a second transistor comprising a second collector, a second base, and a second emitter, wherein the second base is coupled to the first collector, the second collector is coupled to the second resistor, and the second emitter is coupled to ground.

9. The apparatus of claim 8, wherein the controller is coupled to the second collector.

10. The apparatus of claim 7, wherein the vicinity of the zero-crossing is a time period when the AC power waveform is below a threshold voltage.

11. A method for AC power failure detection, comprising the steps of:

(a) amplifying an AC power waveform, wherein the amplified waveform is asserted when the AC power waveform is in a vicinity of a zero-crossing and negated at all other times;

(b) initiating a counter when the amplified waveform is asserted;

(c) terminating the counter if the amplified waveform is negated; and (d) determining if the counter equals or exceeds a reference number before the amplified waveform is negated, wherein the counter being equal or exceeding the reference number indicates an AC power failure, wherein a value of the reference number is programmable.

12. The method of claim 11, wherein the vicinity of the zero-crossing is a time period when the AC power waveform is below a threshold voltage.

13. The method of claim 11, wherein the amplifying step (a) comprises:

(a1) amplifying the AC power waveform with a first amplifier to obtain an intermediate waveform, wherein the intermediate waveform is truncated at a maximum voltage and is inverted; and (a2) amplifying the intermediate waveform with a second amplifier to obtain the amplified waveform, wherein the amplified waveform is truncated at the maximum voltage and is inverted, wherein the amplified waveform is asserted when the AC power waveform is in the vicinity of the zero-crossing and negated at all other times.

14. The method of claim 11, further comprising:

(e) outputting a signal to initiate power down operations, if the counter equals or exceeds the reference number.

15. The method of claim 14, further comprising:

(f) resetting the counter if the counter does not equal or exceed the reference number.

16. A method for AC power failure detection, comprising the steps of:

(a) amplifying a AC power waveform with a first amplifier to obtain an intermediate waveform, wherein the intermediate waveform is truncated at a maximum voltage and is inverted;

(b) amplifying the intermediate waveform with a second amplifier to obtain an amplified waveform, wherein the amplified waveform is truncated at the maximum voltage and is inverted, wherein the amplified waveform is asserted when the AC power waveform is in a vicinity of a zero-crossing and negated at all other times;

(c) initiating a counter when the amplified waveform is asserted;

(d) terminating the counter if the amplified waveform is negated; and (e) determining if the counter equals or exceeds a reference number before the amplified waveform is negated, wherein the counter being equal or exceeding the reference number indicates an AC power failure, wherein a value of the reference number is programmable.

17. The method of claim 16, wherein the vicinity of the zero-crossing is a time period when the AC power waveform is below a threshold voltage.

18. The method of claim 16, further comprising:

(f) outputting a signal to initiate power down operations, if the counter equals or exceeds the reference number.

19. The method of claim 18, further comprising:

(g) resetting the counter if the counter does not equal or exceed the reference number.

20. An apparatus for detecting an AC power failure, comprising:

an AC power source for providing an AC power waveform;

an amplifier coupled to the AC power source, wherein the amplifier amplifies the AC power waveform, wherein the amplified waveform is asserted when the AC power waveform is in a vicinity of a zero-crossing and negated at all other times, wherein the amplifier comprises:

a voltage source for providing a maximum voltage, a first amplifier, comprising:

a first resistor coupled to the voltage source, and a first transistor comprising a first collector, a first base, and a first emitter, wherein the first base is coupled to the AC power source, the first collector is coupled to the first resistor, and the first emitter is coupled to ground, and a second amplifier, comprising:

a second resistor coupled to the voltage source, and a second transistor comprising a second collector, a second base, and a second emitter, wherein the second base is coupled to the first collector, the second collector is coupled to the second resistor, and the second emitter is coupled to ground; and a controller coupled to the second collector, the controller further comprising:

a counter, wherein the counter begins counting when the amplified waveform is asserted, wherein if the counter equals or exceeds a reference number, then an AC power failure is detected, wherein a value of the reference number is programnmable.

21. The apparatus of claim 20, wherein the vicinity of the zero-crossing is a time period when the AC power waveform is below a threshold voltage of the first and second transistors.

22. A system for detecting an AC power failure, comprising:

means for providing an AC power waveform;

means for amplifying the AC power waveform, wherein the amplified waveform is asserted when the AC power waveform is in a vicinity of a zero-crossing and negated at all other times; and means for initiating a counter when the amplified waveform is asserted; and means for determining if the counter equals or exceeds a reference number, wherein the counter being equal or exceeding the reference number indicates an AC power failure, wherein a value of the reference number is programmable.

* * * * *